(12) United States Patent
Yang

(10) Patent No.: US 8,982,034 B2
(45) Date of Patent: Mar. 17, 2015

(54) PORTABLE ELECTRONIC APPARATUS AND BACKLIGHT CONTROL METHOD THEREOF

(75) Inventor: Ming-Jer Yang, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 748 days.

(21) Appl. No.: 12/426,384

(22) Filed: Apr. 20, 2009

(65) Prior Publication Data

US 2009/0262052 A1   Oct. 22, 2009

(30) Foreign Application Priority Data

Apr. 22, 2008   (TW) .............................. 97114692 A

(51) Int. Cl.
| | |
|---|---|
| G09G 5/00 | (2006.01) |
| H04M 1/00 | (2006.01) |
| H04M 1/22 | (2006.01) |
| G09G 3/34 | (2006.01) |
| H04W 52/02 | (2009.01) |

(52) U.S. Cl.
CPC .............. H04M 1/22 (2013.01); G09G 3/3406 (2013.01); G09G 2360/144 (2013.01); H04M 2250/12 (2013.01); H04W 52/027 (2013.01)
USPC ....................................... 345/102; 455/550.1

(58) Field of Classification Search
USPC .................................................. 345/84, 102
See application file for complete search history.

(56) References Cited

U.S. PATENT DOCUMENTS

| | | | |
|---|---|---|---|
| 2002/0021278 A1* | 2/2002 | Hinckley et al. | 345/156 |
| 2005/0219228 A1* | 10/2005 | Alameh et al. | 345/173 |
| 2005/0222801 A1* | 10/2005 | Wulff et al. | 702/141 |
| 2006/0052109 A1 | 3/2006 | Ashman, Jr. et al. | |
| 2006/0087245 A1 | 4/2006 | Ng et al. | |
| 2007/0075965 A1 | 4/2007 | Huppi et al. | |
| 2008/0006762 A1* | 1/2008 | Fadell et al. | 250/201.1 |

FOREIGN PATENT DOCUMENTS

| | | |
|---|---|---|
| CN | 1514992 | 7/2004 |
| CN | 1540620 | 10/2004 |
| EP | 1 701 331 | 9/2006 |
| JP | 2006163294 | 6/2006 |
| TW | 419173 | 1/2001 |

(Continued)

OTHER PUBLICATIONS

English language translation of abstract of CN 1514992 (published Jul. 21, 2004).

(Continued)

*Primary Examiner* — Amare Mengistu
*Assistant Examiner* — Sarvesh J Nadkarni
(74) *Attorney, Agent, or Firm* — McClure, Qualey & Rodack, LLP

(57) ABSTRACT

A portable electronic device and a backlight control method are both provided herein. The portable electronic device includes a display, a backlight module, an orientation sensor, and a light sensor. The backlight control method includes steps of providing the display with a backlight emitted from the backlight module; sensing a spatial position of the portable electronic device with the orientation sensor and generating a first signal in accordance with the spatial position; sensing the brightness of the ambient light outside the portable electronic device with the light sensor and generating a second signal in accordance with the brightness of the ambient light; and turning on or off the backlight module in accordance with the first signal and the second signal.

10 Claims, 5 Drawing Sheets

(56) References Cited

FOREIGN PATENT DOCUMENTS

| TW | 559418 | 10/2003 |
| TW | 200743851 A | 12/2007 |
| WO | WO 00/78012 | 12/2000 |

OTHER PUBLICATIONS

English language translation of abstract of CN 1540620 (published Oct. 27, 2004).

English language translation of abstract of JP 2006163294 (published Jun. 22, 2006).

English language translation of abstract of TW 559418 (published Oct. 21, 2003).

English language translation of abstract of TW 419173 (published Jan. 11, 2001).

English language translation of abstract of TW 200743851 A (published Dec. 1, 2007).

* cited by examiner

PORTABLE ELECTRONIC APPARATUS AND BACKLIGHT CONTROL METHOD THEREOF

RELATED APPLICATIONS

This application claims priority to Taiwan Application Serial Number 97114692, filed Apr. 22, 2008, which is herein incorporated by reference.

BACKGROUND

1. Field of Invention

The invention relates to an electronic device, more particularly, to a portable electronic device.

2. Description of Related Art

Portable electronic devices such as mobile phones, personal digital assistants, notebooks etc., are currently very advanced, and integrating new functions is a main design concern for future portable electronic devices. However, since a user may frequently spend long period of times with the portable electronic device, the power stored may run out quickly making power management become a significant issue.

Taking the mobile phone as an example, when a calling request is received, the user has to push a response key to communicate with the calling party. However, while the user is doing something that requires attention or coordination ability, such as driving or carrying heavy things, it will be much more difficult to push the response key.

Therefore, it is essential to provide an inventive portable electronic device and backlight control method thereof, such that the backlight module of the portable electronic device can be automatically turned on or off in accordance with user's operation modes so as to overcome the aforesaid problems.

SUMMARY

Accordingly, in one aspect, the present invention provides a portable electronic device having a backlight module capable of being automatically turned on or off for power saving.

In another aspect, the present invention also provides a backlight control method for the portable electronic device, which is able to have the backlight module turned on or off in accordance with the user's requirement so as to efficiently manage power.

According to one aspect of the invention, the first embodiment of the invention provides a portable electronic device, which includes a display, a backlight module, an orientation sensor, a light sensor and a processing unit. The backlight module provides a backlight for the display, and the orientation sensor senses a spatial position of the portable electronic device and generates a first signal in accordance with the spatial position. Furthermore, the light sensor senses the brightness of the ambient light outside the portable electronic device and generates a second signal in accordance with the brightness of the ambient light. The processing unit turns the backlight module on or off in accordance with the first signal and the second signal.

According to another aspect, the first embodiment of the invention further provides a backlight control method for the portable electronic device. The method includes the following steps: firstly, providing the display with a backlight; sensing a spatial position of the portable electronic device with the orientation sensor and generating a first signal in accordance with the spatial position; sensing the brightness of the external ambient light with a light sensor and generating a second signal in accordance with the brightness of the ambient light; and then turning on or off the backlight module in accordance with the first signal and the second signal. Additionally, after the backlight is turned off, the orientation sensor will generate another first signal, so that the processing unit can turn on the backlight in accordance with the another first signal.

Moreover, according to the second embodiment of the invention, when a calling request is received, the orientation sensor and the light sensor will generate a first signal and a second signal respectively, so that the calling request can be automatically accepted in accordance with the first signal and the second signal.

Similarly, after the calling request is automatically accepted, the processing unit can turn on the backlight module in accordance with another first signal generated by the orientation sensor.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
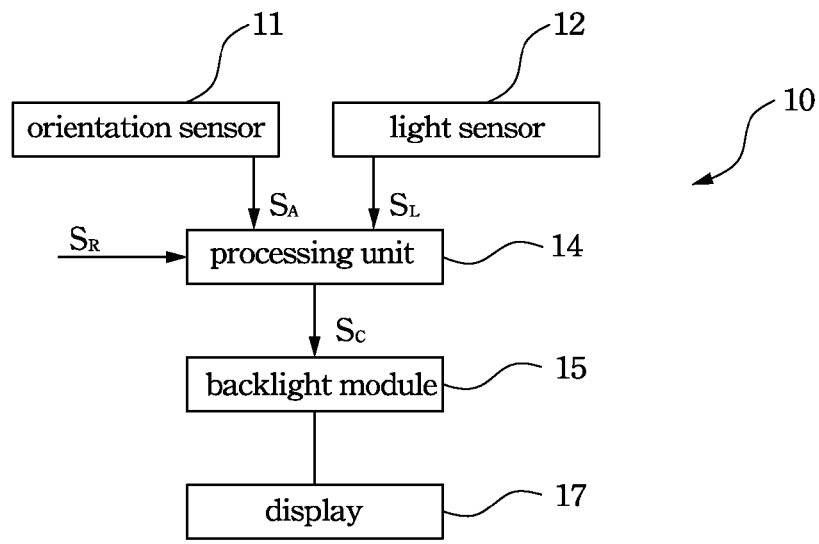
FIG. 1 is a functional diagram illustrating a portable electronic device according to a first embodiment of the invention.

Reference will now be made in detail to the present embodiments of the invention, examples of which are illustrated in the accompanying drawings. Wherever possible, the same reference numbers are used in the drawings and the description to refer to the same or like parts.

In the following description, the backlight control device and method are implemented in a portable electronic device, which may be a mobile phone, a personal digital assistance, or a notebook etc. However, the mobile phone is implemented in exemplified embodiments provided below.

For example, if the user accepts a phone call, the mobile phone shall be moved closer to the user's ear. If the user wants to read some information shown on the display while communicating with the calling party, the mobile phone also must be moved far away from the user's ear.

In the embodiment below, when a user accepts a phone call or looks at the display, an orientation sensor disposed in the mobile phone can sense the spatial position of the mobile phone and a light sensor disposed around the speaker hole can sense the light variation of the surroundings so as to determine the user's operation modes, and then the backlight module can be automatically turned on or off in accordance with the user's operation modes.

FIG. 1 is a functional diagram illustrating a portable electronic device according to a first embodiment of the invention. In the first embodiment, the portable electronic device can be a mobile phone 10. The mobile phone 10 can automatically turn on or off its backlight module 15 in accordance with a variety of user operation modes so as to manage the power efficiently. Thus, unnecessary power consumption is effectively reduced.

The mobile phone 10 includes an orientation sensor 11, a light sensor 12, a processing unit 14, a backlight module 15 and a display 17. The orientation sensor 11 is capable of sensing a spatial position of the mobile phone 10 and generating a first signal $S_A$ in accordance with the spatial position. The light sensor 12 is capable of sensing the brightness of the ambient light outside the mobile phone 10 and generating a second signal $S_L$ in accordance with the brightness of the ambient light. The processing unit 14 is capable of selectively turning on or off the backlight module 15 of the display 17 in accordance with the first signal and the second signal. The display 17 is capable of displaying information, and the backlight module 15 provides such a backlight to the display 17 that the user can read information displayed on the display 17.

The generation process of the first signal $S_A$ and the second signal $S_L$ is described below.

When the calling request is received, the user will move the mobile phone 10 in order to listen to the calling party, and thus the spatial position of the mobile phone 10 will also be changed. In the meantime, the orientation sensor 11 senses the space orientation of the spatial position and generates the first signal $S_A$ accordingly. Furthermore, the light sensor 12 is disposed on the same side with the speaker hole in the mobile phone 10, so that when the user is listening to the calling party with the speaker hole close to the user's ear, the ambient light around the speaker hole is sufficiently reduced, so the light sensor 12 can detect the light variation and generate the second signal $S_L$ accordingly. Later, the processing unit 14 will analyze the first signal $S_A$ and the second signal $S_L$ to turn off the backlight module 15.

Therefore, when the user is listening to the calling party, the backlight module 150 can be automatically turned off to reduce unnecessary power consumption.

Figure 2:
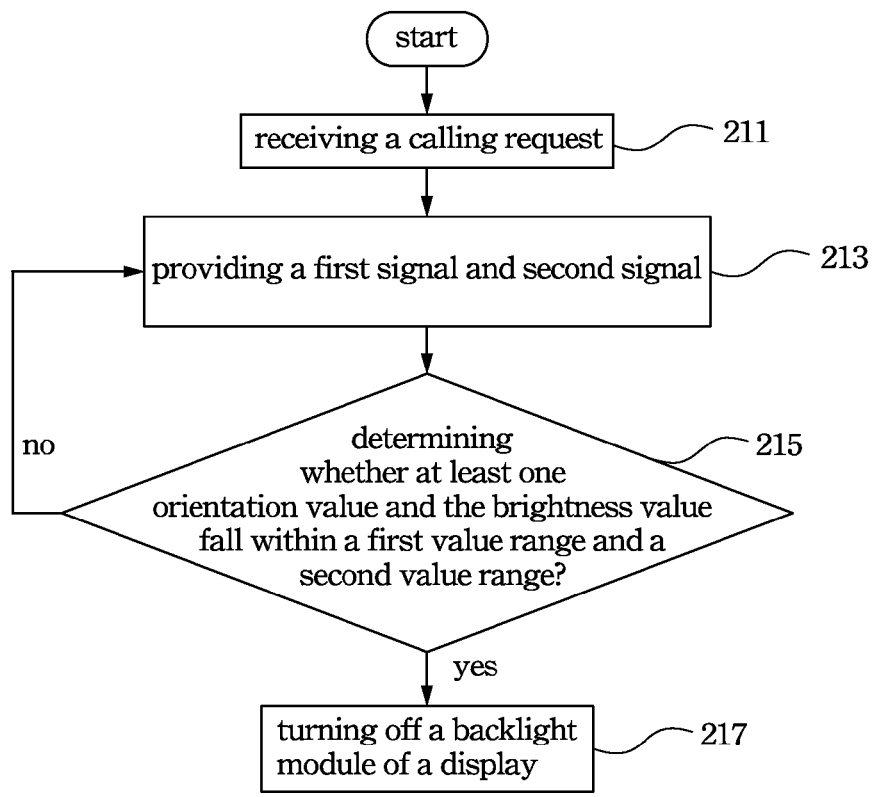
FIG. 2 is a flow chart illustrating a backlight control method for the portable electronic device according to a first embodiment of the invention.

FIG. 2 is a flow chart illustrating a backlight control method for the portable electronic device according to a first embodiment of the invention. Referring to FIG. 1 and FIG. 2, in step 211, when the mobile phone receives a calling request $S_R$ for communication, the user has to press an accepting key on the mobile phone, so that the calling request $S_R$ can be accepted to allow the communication to start. It should be noted the difference between receiving and accepting the calling request. That is, when the mobile phone receives the calling request, the communication between the user and the calling party has not been permitted. However, after accepting the calling request, the user and calling party are permitted to communicate with each other. For those skilled in the art, the difference between receiving and accepting the calling request is clear.

In step 213, after the mobile phone 10 receives or the user accepts the calling request $S_R$, the processing unit 14 will enable the orientation sensor 11 and the light sensor 12 to generate the first signal $S_A$ and the second signal $S_B$ respectively in accordance with the spatial position and the ambient light of the mobile phone. The first signal $S_A$ can correspond to a plurality of orientation values, which are respectively related to different reference coordinates, and the second signal $S_L$ can correspond to a brightness value. In step 215, the processing unit 14 determines whether the at least one orientation values fall within a first value range and the brightness value falls within a second value range. If the results show the at least one orientation values fall within the first value range and the brightness value falls within the second value range, it means that the user is communicating with the calling party, and therefore the backlight module 15 is turned off in step 217.

An exemplary processing unit will be described below.

Figure 3:
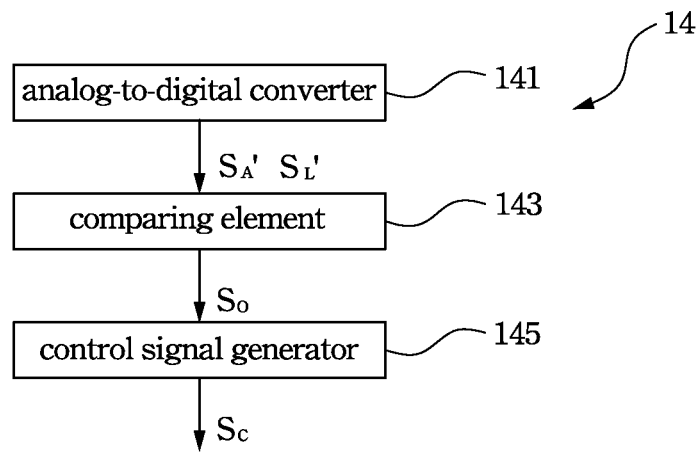
FIG. 3 is a functional diagram illustrating the processing unit 14 of the portable electronic device shown in FIG. 1.

FIG. 3 is a functional diagram illustrating the processing unit 14 of the portable electronic device shown in FIG. 1. The processing unit 14 includes an analog-to-digital converter 141, a comparing element 143, and a control signal generator 145. Before the first signal $S_A$ and the second signal $S_L$ are analyzed, the analog-to-digital converter 141 can convert the analogue first signal $S_A$ and the second signal $S_L$ to a digital first signal $S_A'$ and a second signal $S_L'$ respectively. Since the first signal $S_A$ and the second signal $S_L$ can correspond to a plurality of orientation values and a brightness value respectively, the comparing element 143 can determine whether the orientation values fall within a first value ranges respectively and determine whether the second signal falls within a second value range. If the results show that the orientation values fall within the first value ranges respectively and the second signal falls within the second value range, it means that the user is communicating with the mobile phone 10, and therefore the control signal generator 145 can output a backlight control signal $S_C$ to turn off the backlight module.

In the first embodiment of the present invention, the orientation sensor 11 can be an acceleration sensor.

Figure 4:
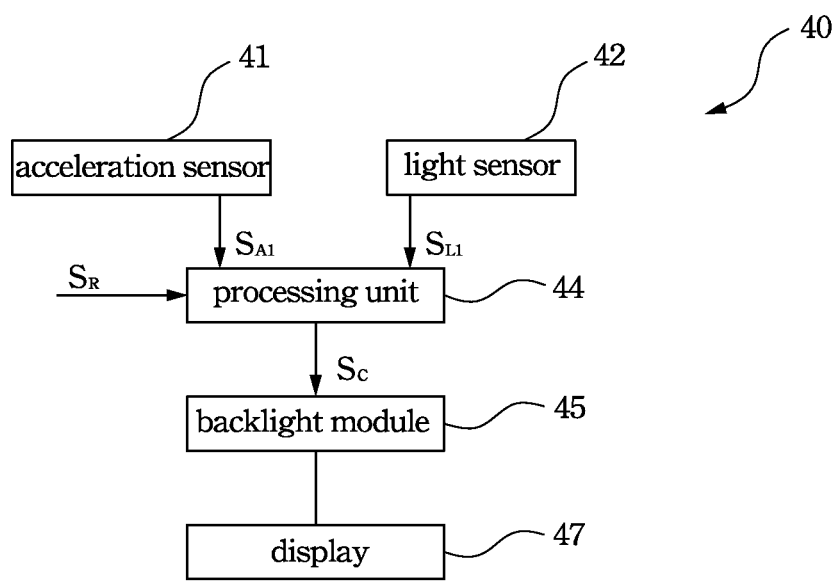
FIG. 4 is another functional diagram of the portable electronic device according to the first embodiment of the invention.

FIG. 4 is another functional diagram of the portable electronic device according to the first embodiment of the invention. The backlight control device 40 includes an acceleration sensor 41, a light sensor 42 and a processing unit 44. The acceleration sensor 41 can generate an accelerating signal $S_{A1}$ and the light sensor 42 can generate a second signal $S_{L1}$. After the mobile phone has received the calling request $S_R$, the processing unit 44 starts to analyze the accelerating signal $S_{A1}$ and the second signal $S_{L1}$ to determine whether the backlight module 45 should be turned on or off in accordance with the backlight control signal $S_C$.

According to the first embodiment of present invention, the acceleration sensor 41 can be replaced with a gyro sensor, and the processing unit 44 can be implemented by a central processing unit or a microprocessor.

Figure 5:
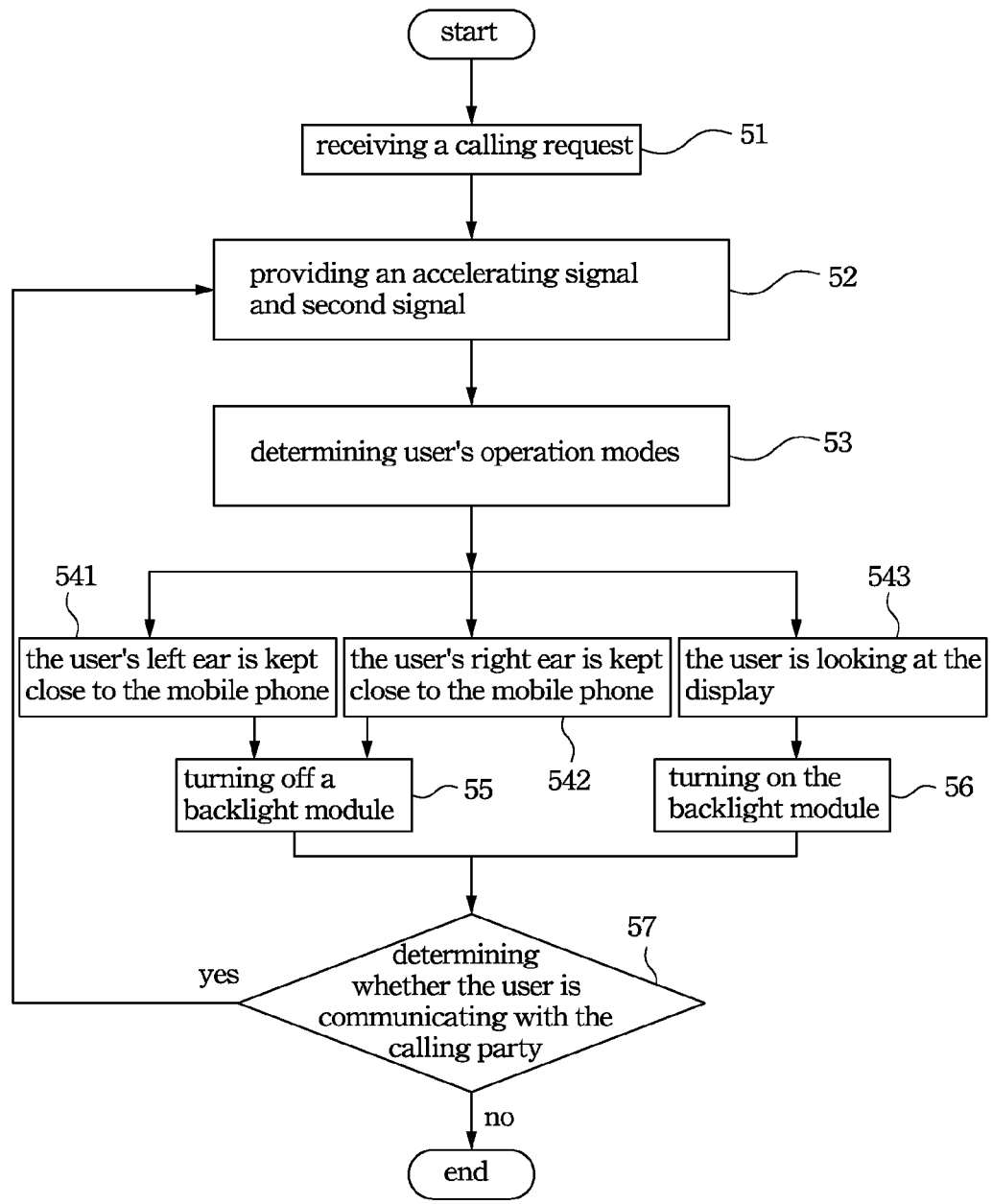
FIG. 5 is another flow chart illustrating a backlight control method for the portable electronic device according to a first embodiment of the invention.

FIG. 5 is another flow chart illustrating a backlight control method for the portable electronic device according to a first embodiment of the invention. Referring to FIG. 4 and FIG. 5, in step 51, when a mobile phone receives a calling request, which is to request communication, the user can accept the calling request by pressing an accepting key to allow communication with the mobile phone. In step 52, the processing unit 44 enables the acceleration sensor 41 and the light sensor 42 to generate the accelerating signal $S_{A1}$ and the second signal $S_{L1}$ respectively, and then both the signals will be provided to the processing unit 44. In step 53, the processing unit 44 determines the user's operation modes in accordance with the accelerating signal $S_{A1}$ and the second signal $S_{L1}$. For example, there will be three kinds of operation modes in accordance with the accelerating signal $S_{A1}$ and the second signal $S_{L1}$, these operation modes include determining whether the user's left ear is kept close to the mobile phone (step 541), determining whether the user's right ear is kept close to the mobile phone (step 542), and determining whether the user is looking at the display (step 543). If it is determined that the user's left or right ear is kept close to the mobile phone, it can be assumed that the user is answering the phone call so a backlight module 45 is turned off in step 55. If it is determined that the user is looking at the display, thus the backlight module is turned on in step 56.

After turning off the backlight module 45 in the step 55, if the user takes the mobile phone away from his/her ear to read some information shown on the display during the communication period, the movement of the mobile phone will induce the acceleration sensor 41 to generate another accelerating signal. The processing unit 44 then analyzes the another accelerating signal so as to turn on the backlight module 45, so that the information can be shown on the display. In the first embodiment, another second signal outputted from the light sensor 42 can be selectively implemented to determine whether the backlight module 45 is to be turned on or not.

In step 57, it is determined whether the user is communicating with the calling party, if the user is still communicating with the mobile phone, then it will go back to the step 52 and receive other accelerating signals and second signal. If the user has ended the communication, then other accelerating signals and second signal will no longer be generated.

According to the first embodiment of the invention, during the communication period, the backlight module will be automatically turned on while the user is watching the display. Furthermore, once the user listens to the calling party, the backlight module will be automatically turned off. Therefore, the system power management efficiency can be increased.

The determination of the different user's operation modes will be described below in detail.

For example, for precisely determining whether the user is listening to the calling party, the first step is to get the three-dimensional coordinate signals generated by the acceleration sensor while the left ear or right ear is kept close to the speaker hole of the mobile phone. The three-dimensional coordinate signals correspond to three sets of orientation value, which include an X-coordinate, a Y-coordinate and a Z-coordinate. If the X-coordinate, the Y-coordinate and the Z-coordinate respectively fall within three sets of predetermined orientation value ranges, it is determined that the user is listening to the calling party, and therefore the backlight module of the mobile phone will be turned off.

Similarly, for precisely determining whether the user is looking at the display, the first step is to get the three-dimensional coordinate signals generated by the acceleration sensor while the user is looking at the display. The three-dimensional coordinate signals correspond to three sets of orientation value, which include an X-coordinate, a Y-coordinate and a Z-coordinate. If the X-coordinate, the Y-coordinate and the Z-coordinate respectively fall within the other three sets of predetermined orientation value ranges, it is determined that the user is looking at the display, and therefore the backlight module of the mobile phone is turned on.

Moreover, for determining whether the user is communicating with the calling party or looking at the display in accordance with the second signal, firstly, it will require many signals to be analyzed in order to generate a first brightness value range and a second brightness value range. If the second signal provided falls within the first brightness value range, it is determined that the user is listening to the calling party, so the backlight module of the display will be turned off. If the second signal provided falls within the second brightness value range, it is determined that the user is looking at the display, so the backlight module of the display will be turned on.

According to the first embodiment of the invention, the backlight control device and the method can determine the user's operation modes in accordance with the first signal and the second signal, so that the backlight module of the portable electronic device can be turned on or off automatically to save more power.

On the other hand, according to the second embodiment of the invention, when a calling request is received, the user only needs to move the mobile phone closer to his/her ear to start the communication. That is, the calling request can be automatically accepted in accordance with the first signal and second signal provided without pushing any key.

The second embodiment of the invention will be described in detail below.

Figure 6:
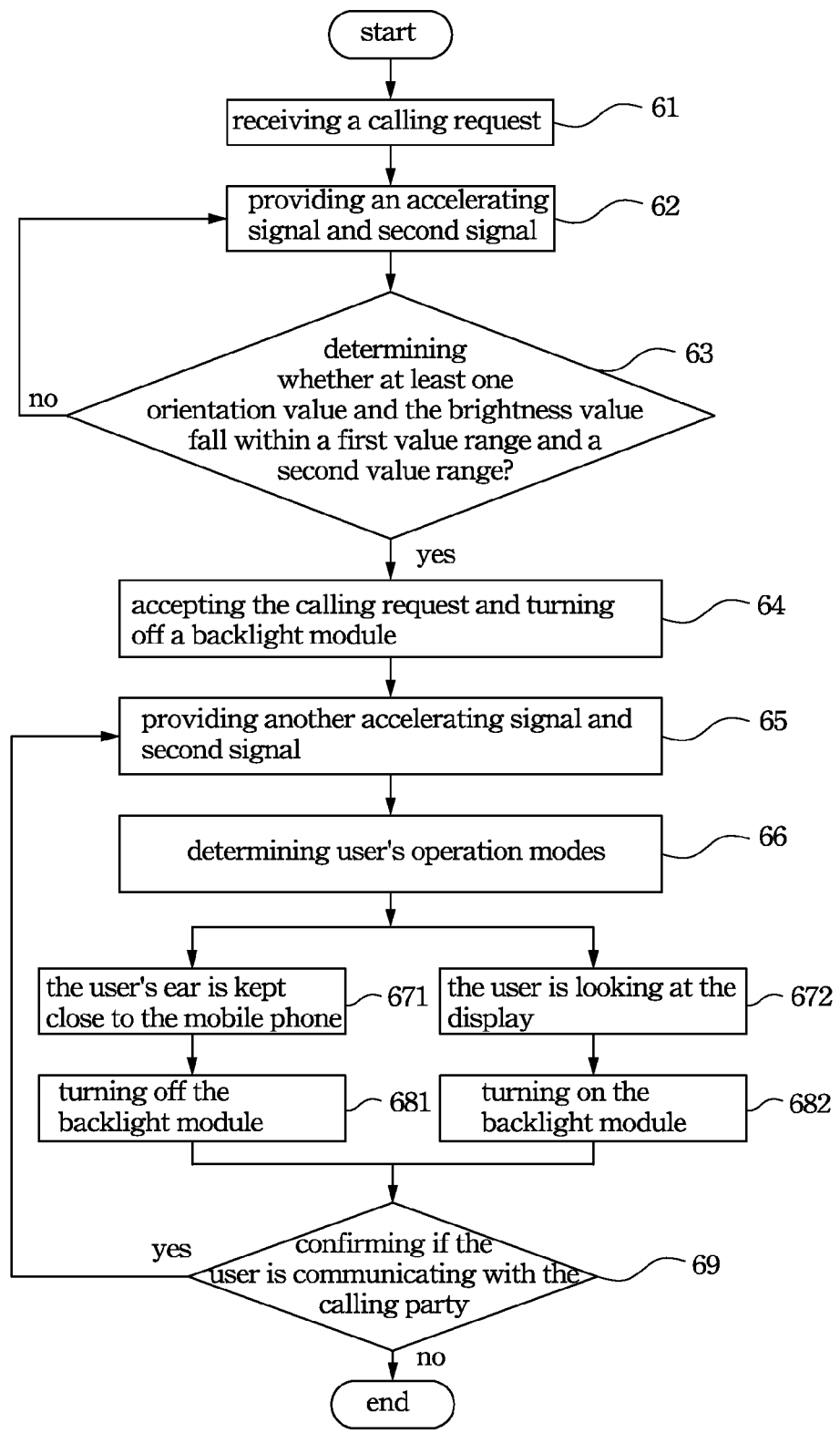
FIG. 6 is a flow chart illustrating a backlight control method for the portable electronic device according to a second embodiment of the invention.

FIG. 6 is a flow chart illustrating a backlight control method for the portable electronic device according to a second embodiment of the invention. Referring to FIG. 4 and FIG. 6, in step 61, a processing unit 44 receives a calling request. In step 62, the processing unit 44 enables the acceleration sensor 41 and the light sensor 42 to generate an accelerating signal $S_{A1}$ and a second signal $S_{L1}$ respectively, and provides both the signals to the processing unit 44. In step 63, the processing unit 44 determines whether at least one orientation value, which correspond to the accelerating signal, falls within a first predetermined value range and the second signal, which corresponds to the second signal, falls within a second predetermined value range.

If the two conditions of step 63 are both satisfied, it means that the user intends to communicate with the calling party, and therefore the calling request is automatically accepted and the backlight module is turned off (step 64).

According to the second embodiment of the invention, during the communication period, the backlight module is turned off or on in accordance with user's operation modes. That is to say, in step 65, the processing unit 44 receives another accelerating signal and second signal, and the following step 66 is to determine user's operation modes. If it is determined that the user's ear is kept close to the mobile phone, the backlight module will be turned off (steps 671 and 681). If it is determined that the user is looking at the display, the backlight module will be turned on (steps 672 and step 682). In step 69, it is confirmed if the user is communicating with the calling party. If the user is communicating with the calling party, the processing unit 44 will receive another accelerating signal and second signal in step 65, and then determine user's operation modes so as to turn on or off the backlight module.

According to the second embodiment of the invention, the backlight control method of the second embodiment can determine the user's operation modes in accordance with the accelerating signal and the second signal provided, so that the backlight module can be automatically turned on or off, during the communication period. Thus the unnecessary power consumption can be reduced.

Figure 7:
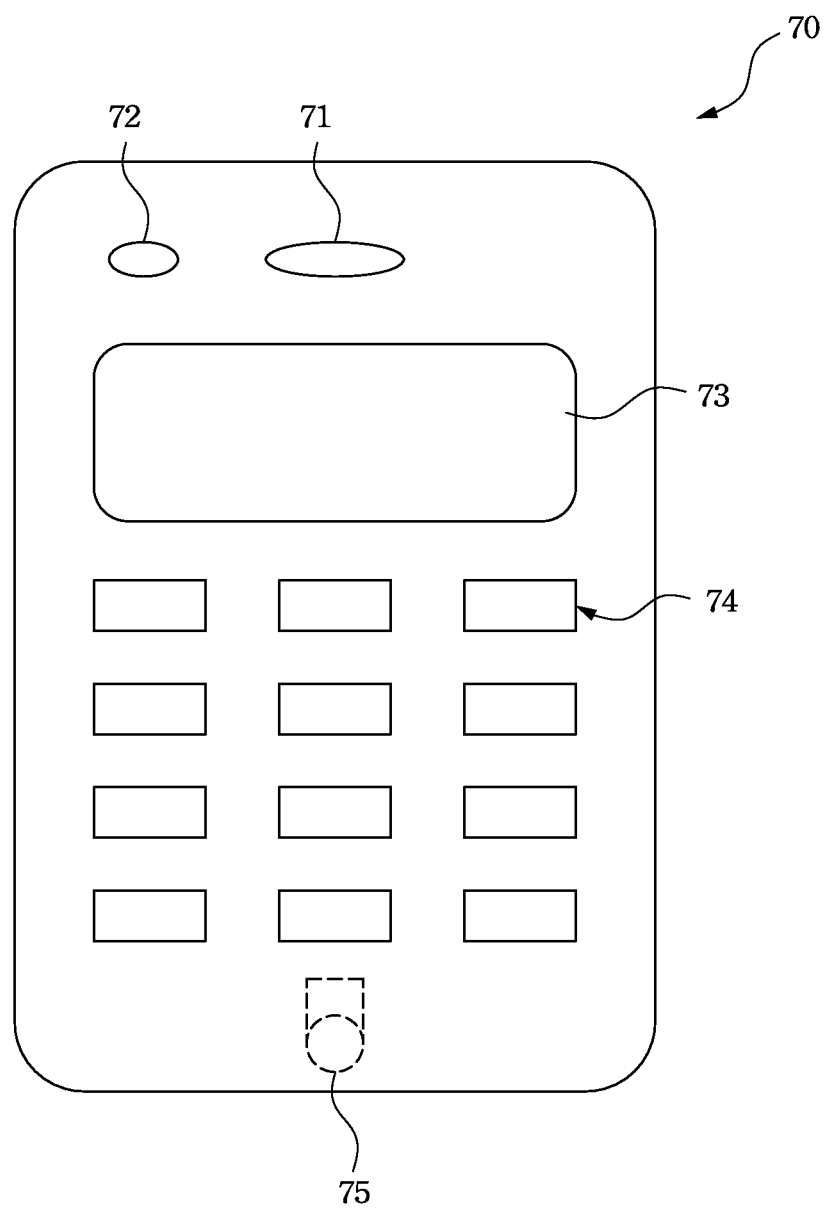
FIG. 7 is a front view of a portable electronic device according to the first and the second embodiment of the invention.

FIG. 7 is a front view of a portable electronic device according to the first and the second embodiment of the invention. The mobile phone 70 includes a speaker hole 71, a light sensor 72, a display 73, keys 74 and an orientation sensor 75 disposed below the keys 74. During the communication period, the backlight module (not shown) of the display 73 can be automatically turned on or off in accordance with the first signal and light signal, which are generated by the orientation sensor 75 and the light sensor 72 in accordance with the spatial position and ambient light respectively, so the consumption of unnecessary power can be minimized.

According to the first and second embodiment, the advantages of present invention, which provides backlight control devices and methods, are described below.

The backlight module of the display can be automatically turned on or off in accordance with the first signal and second signal, which are generated by the orientation sensor 75 and the light sensor 72 respectively, so the consumption of unnecessary power can be minimized.

Also, the calling request can be automatically accepted in accordance with the first signal and second signal, which are generated by the orientation sensor 75 and the light sensor 72 respectively, without pushing any accepting key, so that it will be much more convenient for the user to answer the phone call.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A portable electronic device with a speaker hole defined thereon, comprising:
   a display;
   a backlight module for providing the display with a backlight;
   an orientation sensor for sensing a spatial position of the portable electronic device and generating a first signal in accordance with the spatial position, wherein the first signal corresponds to at least one first orientation value;
   a light sensor, disposed on the same side with and around the speaker hole, for sensing a brightness of an ambient light outside the portable electronic device and generating a second signal in accordance with the brightness, wherein the second signal corresponds to a brightness value; and
   a processing unit for turning on or off the backlight module in accordance with the at least one first orientation value and the brightness value,
   wherein after a calling request is received, the processing unit enables the orientation sensor and the light sensor to generate the first signal and the second signal, and if the at least one first orientation value falls within a first value range and the brightness value falls within a second value range, the processing unit has the calling request automatically accepted for a communication and turns off the backlight module, and
   wherein after the calling request is automatically accepted and the backlight module is turned off and before the communication is ended, the orientation sensor generates another first signal, which corresponds to at least one second orientation value, and the processing unit turns on the backlight module if the at least one first orientation value falls within the second value range.

2. The portable electronic device of claim 1, wherein the processing unit is further used for determining whether the at least one first orientation value falls within a first value range and the brightness value falls within a second value range.

3. The portable electronic device of claim 1, wherein the processing unit comprises an analog-to-digital converter for converting the first signal and the second signal into two digital signals.

4. The portable electronic device of claim 1, wherein the orientation sensor is an acceleration sensor.

5. The portable electronic device of claim 1, wherein the orientation sensor is a gyro sensor.

6. The portable electronic device of claim 1, wherein the processing unit is a microprocessor.

7. The portable electronic device of claim 1, wherein after the communication is ended, the orientation sensor stops generating the first signal and the light sensor stops generating the second signal.

8. A control method for a portable electronic device, the portable electronic device including a display, a backlight module, an orientation sensor, and a light sensor, the method comprising:
   providing a backlight from the backlight module for the display;
   enabling the orientation sensor and the light sensor after a calling request is received;
   generating a first signal with the orientation sensor in accordance with a spatial position of the portable electronic device, wherein the first signal corresponds to at least one first orientation value;
   generating a second signal with the light sensor in accordance with the brightness of an ambient light outside the portable electronic device, wherein the second signal corresponds to a brightness value;
   automatically accepting a calling request for a communication and turning off the backlight module if the at least one first orientation value falls within a first value range and the brightness value falls within a second value range after the calling request is received; and
   after the calling request is automatically accepted and the backlight module is turned off and before the communication is ended, generating another first signal, which corresponds to at least one second orientation value, and turning on the backlight module if the at least one first orientation value falls within the second value range.

9. The control method of claim 8, further comprising:
   converting the first signal and the second signal into two digital signals.

10. The control method of claim 8, further comprising:
    after the communication is ended, stopping generating the first signal with the orientation sensor and stopping generating the second signal with the light sensor.

\* \* \* \* \*